(12) United States Patent
Teng et al.

(10) Patent No.: US 12,263,402 B2
(45) Date of Patent: Apr. 1, 2025

(54) TRIGGER DRIVING APPARATUS AND HAND-HELD TERMINAL HAVING SAID APPARATUS

(71) Applicant: GOERTEK INC., Shandong (CN)

(72) Inventors: Xuefang Teng, Shandong (CN); Yanlong Liu, Shandong (CN); Dong Liang, Shandong (CN); Lin Geng, Shandong (CN); Xing Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 261 days.

(21) Appl. No.: 17/904,979

(22) PCT Filed: Oct. 31, 2020

(86) PCT No.: PCT/CN2020/125616
§ 371 (c)(1),
(2) Date: Aug. 25, 2022

(87) PCT Pub. No.: WO2021/169371
PCT Pub. Date: Sep. 2, 2021

(65) Prior Publication Data
US 2023/0114723 A1 Apr. 13, 2023

(30) Foreign Application Priority Data
Feb. 27, 2020 (CN) .......................... 202010125765.3

(51) Int. Cl.
*A63F 13/285* (2014.01)
*A63F 13/21* (2014.01)
*A63F 13/24* (2014.01)

(52) U.S. Cl.
CPC ............ *A63F 13/285* (2014.09); *A63F 13/21* (2014.09); *A63F 13/24* (2014.09); *A63F 2300/1037* (2013.01); *A63F 2300/1043* (2013.01)

(58) Field of Classification Search
CPC ........ A63F 13/285; A63F 13/21; A63F 13/24; A63F 2300/1037; A63F 2300/1043
See application file for complete search history.

(56) References Cited

U.S. PATENT DOCUMENTS

| 6,053,814 A | * | 4/2000 | Pchenitchnikov | .... A63F 13/219 463/43 |
| 2005/0124416 A1 | * | 6/2005 | Hammond | .............. A63F 13/24 463/37 |

(Continued)

FOREIGN PATENT DOCUMENTS

| CN | 206355570 U | 7/2017 |
| CN | 207169022 U | 4/2018 |

(Continued)

*Primary Examiner* — Steve Rowland
(74) *Attorney, Agent, or Firm* — LKGlobal | Lorenz & Kopf, LLP

(57) ABSTRACT

A trigger driving apparatus and hand-held terminal having said apparatus are provided. Wherein the trigger driving apparatus comprises a bracket (8) and a movable trigger housing arranged on the bracket, and further comprises: a drive device, wherein a drive shaft of the drive device is connected to one end of a link rod mechanism, the other end of the link rod mechanism is connected to the trigger housing, and the drive shaft is configured to drive the trigger housing to move; a detection device is configured to detect the state of the trigger housing; a control device is configured to receive the state signal detected by the detection device, and control the output torque of the drive device according to the state signal.

17 Claims, 1 Drawing Sheet

(56) References Cited

U.S. PATENT DOCUMENTS

| | | | | |
|---|---|---|---|---|
| 2005/0255918 | A1* | 11/2005 | Riggs | A47C 3/16 |
| | | | | 463/37 |
| 2011/0275436 | A1* | 11/2011 | Kidakarn | A63F 13/803 |
| | | | | 463/37 |
| 2012/0142418 | A1* | 6/2012 | Muramatsu | A63F 13/24 |
| | | | | 463/37 |
| 2014/0315642 | A1* | 10/2014 | Grant | A63F 13/285 |
| | | | | 345/184 |
| 2015/0133221 | A1* | 5/2015 | Danny | A63F 13/92 |
| | | | | 345/184 |
| 2015/0238855 | A1* | 8/2015 | Uy | A63F 13/24 |
| | | | | 463/37 |
| 2016/0193529 | A1* | 7/2016 | Burgess | A63F 13/24 |
| | | | | 463/37 |
| 2016/0320858 | A1* | 11/2016 | Rubio | G06F 3/0202 |
| 2016/0325177 | A1* | 11/2016 | Antonio | A63F 13/24 |
| 2016/0351362 | A1* | 12/2016 | Tsai | G06F 3/0489 |
| 2018/0250587 | A1* | 9/2018 | Strahle | A63F 13/25 |
| 2019/0163271 | A1* | 5/2019 | Heubel | A63F 13/285 |
| 2019/0344170 | A1 | 11/2019 | Schmitz et al. | |
| 2020/0023270 | A1* | 1/2020 | Forest | G06F 3/02 |

FOREIGN PATENT DOCUMENTS

| | | |
|---|---|---|
| CN | 207445556 U | 6/2018 |
| CN | 110538453 A | 12/2019 |
| CN | 110709144 A | 1/2020 |
| CN | 110709145 A | 1/2020 |
| CN | 111330261 A | 6/2020 |

* cited by examiner

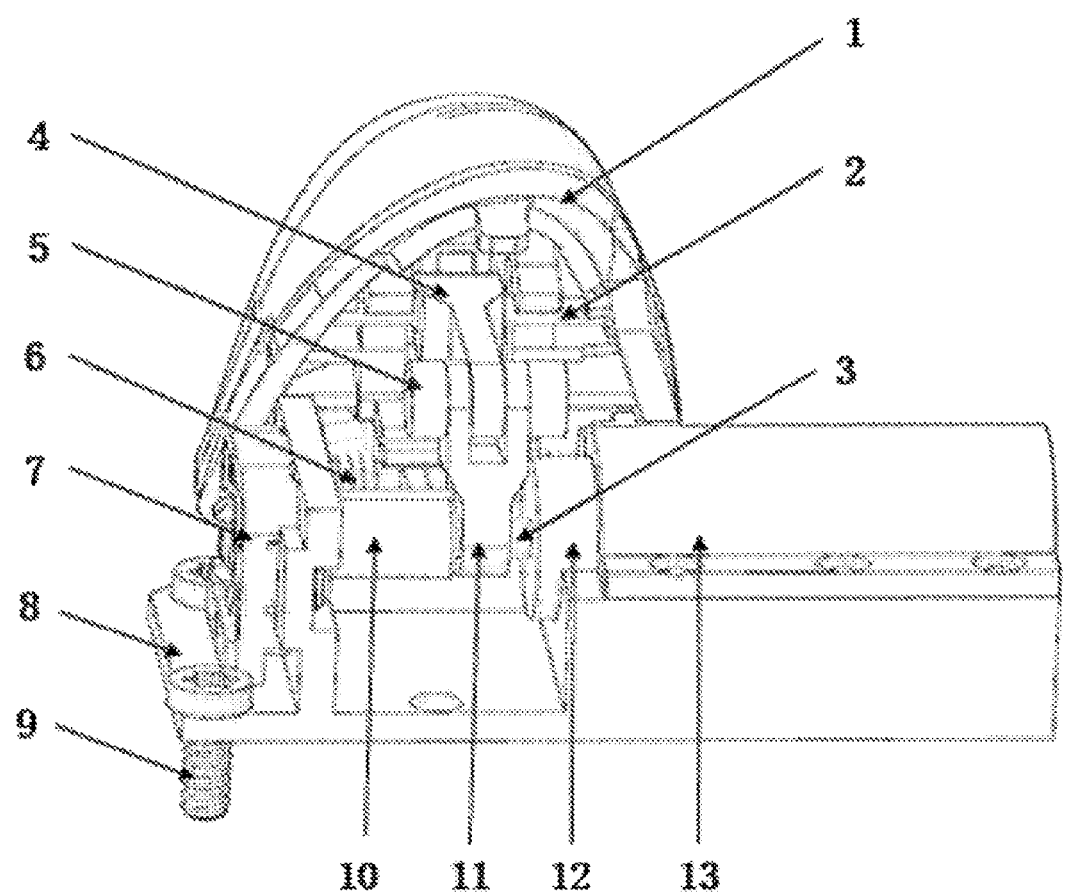

TRIGGER DRIVING APPARATUS AND HAND-HELD TERMINAL HAVING SAID APPARATUS

CROSS-REFERENCE TO RELATED APPLICATION

This Application is a U.S. National-Stage entry under 35 U.S.C. § 371 based on International Application No. PCT/CN2020/125616, filed Oct. 31, 2020 which was published under PCT Article 21(2) and which claims priority to Chinese Application No. 202010125765.3, filed Feb. 27, 2020, which are all hereby incorporated herein in their entirety by reference.

TECHNICAL FIELD

This application pertains to the technical field of control terminals, in particular to a trigger driving apparatus. In addition, the present disclosure also relates to a hand-held terminal having said trigger driving apparatus.

BACKGROUND

With the progress of society and the development of network technology, more and more games have been developed and favored by people. As a game apparatus, gamepad has become an indispensable operating device for players.

The main function of the ordinary gamepad is to realize the operation functions of the game, such as controlling the direction, marching, jumping, weapon launching, etc., but the most important thing of the game is to provide players with an immersive gaming experience. However, the trigger structure of the traditional gamepad relies on the spring to provide the reset elastic force, and the elastic force is only related to the pressing force, so the actual experience of the user is poor.

To sum up, how to provide a trigger structure with rich experience is an urgent problem to be solved by those skilled in the art. In addition, other objects, desirable features and characteristics will become apparent from the subsequent summary and detailed description, and the appended claims, taken in conjunction with the accompanying drawings and this background.

SUMMARY

In view of this, the purpose of the present disclosure is to provide a trigger driving apparatus, which can provide users with different experiences of pressing and rebounding, so as to enrich the user's use experience.

Another purpose of the present disclosure is to provide a hand-held terminal having said trigger driving apparatus.

In order to achieve the above purpose, the present disclosure provides the following technical solutions:

A trigger driving apparatus, comprising a bracket and a movable trigger housing arranged on the bracket, further comprising:

a drive device, wherein a drive shaft of the drive device is connected to one end of a link rod mechanism, the other end of the link rod mechanism is connected to the trigger housing, and the drive shaft is configured to drive the trigger housing to move;

a detection device is configured to detect the state of the trigger housing;

a control device is configured to receive the state signal detected by the detection device, and control the output torque of the drive device according to the state signal.

Preferably, the link rod mechanism comprises a lower contact connecting rod with one end fixed on the drive shaft, a transition shaft hinged on the other end of the lower contact connecting rod, and an upper contact connecting rod hinged on the transition shaft, wherein the upper contact connecting rod is hinged to a trigger connecting shaft, and the trigger connecting shaft is fixed on the trigger housing; the transition shaft is a free shaft that is moveable in space, and the transition shaft is parallel to the trigger connecting shaft.

Preferably, the end of the lower contact connecting rod for connecting the transition shaft has two parallel connecting parts, both of the connecting parts are sleeved with the transition shaft. The end of the upper contact connecting rod connected to the transition shaft is clamped between the two connecting parts.

Preferably, the thickness of the end of the upper contact connecting rod for connecting the trigger connecting shaft is greater than the thickness of the other end.

Preferably, the detection device includes a positioner which is configured to detect the position of the trigger housing or detect the angle of the trigger housing, and the positioner is arranged on the bracket.

Preferably, the positioner obtains the position of the trigger housing by detecting the drive shaft, and the drive shaft is connected to the positioner through a positioner rotating shaft.

Preferably, the rotation axis of the positioner rotating shaft is collinear with the rotation axis of the drive shaft.

Preferably, the trigger housing is hinged to the bracket through a hinge shaft, a torsion spring is sleeved on the hinge shaft, and two ends of the torsion spring abut the bracket and the trigger housing respectively.

Preferably, the trigger housing is fixed to the hinge shaft, and the positioner obtains the position of the trigger housing by measuring the hinge shaft.

A hand-held terminal, comprising the trigger driving apparatus in any one of the above.

The present disclosure realizes the control of the force of the trigger housing through the output of the drive device, and realizes the detection of the state of the trigger housing and the feedback control of the trigger housing using the detection, through the cooperation of the detection device and the control device. The magnitude of the feedback force can be precisely adjusted by feedback adjustment to achieve different mechanical impact effects of the trigger housing, and provide users with different feedback forces to improve the different experience effects of the game.

BRIEF DESCRIPTION OF DRAWINGS

The present invention will hereinafter be described in conjunction with the following drawing FIGURES, wherein like numerals denote like elements, and:

FIG. 1 is a schematic diagram of a trigger driving apparatus provided by the present disclosure.

The reference symbols in FIG. 1 are as follows: 1: trigger housing, 2: trigger connecting shaft, 3: drive shaft, 4: upper contact connecting rod; 5: transition shaft, 6: return spring, 7: positioner, 8: bracket, 9: anchor bolt, 10: positioner rotating shaft, 11: lower contact connecting rod, 12: drive device, 13: motor protective cover trigger housing.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in the embodiments of the present invention will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative efforts shall fall within the protection scope of the present disclosure.

The core of the present disclosure is to provide a trigger driving apparatus, which can provide users with different experiences of pressing and rebounding, so as to enrich the user's use experience.

Another core of the present disclosure is to provide a hand-held terminal having the above trigger driving apparatus.

Referring to FIG. 1, which is a schematic diagram of a trigger driving apparatus provided by the present disclosure.

The present disclosure provides a trigger driving apparatus, which is mainly used on the handle of a gamepad or an interactive somatosensory device, so as to realize the control and adjustment of the use experience of the trigger. The trigger driving apparatus includes a bracket 8 and a movable trigger housing 1 arranged on the bracket 8, and further includes:

- a drive device 12, wherein the drive shaft 3 of the drive device 12 is connected to one end of a link rod mechanism, the other end of the link rod mechanism is connected to the trigger housing 1, and the drive shaft 3 is configured to drive the trigger housing 1 to move;
- a detection device is configured to detect the state of the trigger housing 1;
- a control device is configured to receive the state signal detected by the detection device, and control the output torque of the drive device 12 according to the state signal.

It should be noted that the bracket 8 is a base structure in the trigger driving apparatus, and is configured to set other functional structures. The trigger housing 1 can move relative to the bracket 8, including rotation or movement. In the present disclosure, the bracket 8 can be fixed in the handle, or can be movably and fixedly arranged in the handle.

The trigger housing 1 is movably arranged on the bracket 8, and when pressed by an external force, the trigger housing 1 can move relative to the bracket 8. In a certain state after the trigger housing 1 is pressed, the control device controls the drive device 12 to work, so that the drive shaft 3 of the drive device 12 drives the link rod mechanism to move, and the other end of the link rod mechanism is connected to the trigger housing 1. The output of the drive device 12 acts on the trigger housing 1 to provide the trigger housing 1 with a force to accelerate the rebound, or to provide a force to hinder the rebound. The control device can apply additional force to the trigger housing 1 according to the current usage environment, so that the user's hand can feel different feedback forces. The different usage environments refer to, for example, that the trigger is used to simulate shooting or firing in the game.

It should be noted that the certain state after the trigger housing 1 is pressed means that the trigger housing 1 is in a pressed state, or a state in which the trigger housing 1 is about to rebound after the external force is removed.

In the present disclosure, the drive device is used to drive the link rod mechanism to move, so that an additional force is applied to the trigger housing 1. The additional force that is applied to the trigger housing 1 can make the user feel different trigger rebound strengths. At meanwhile, a current state of the trigger housing 1 is obtained by the detection device. The control device performs feedback adjustment on the output torque of the drive device base on the current control needs and the current state of the trigger housing 1, until the state of the trigger housing 1 is in the target state.

Optionally, the drive device 12 may be a motor, and correspondingly, the drive shaft 3 may be a motor rotating shaft. Of course, the two are not limited to the above, and may also be other type of drive device.

On the basis of the above embodiment, the link rod mechanism includes a lower contact connecting rod 11 whose one end is fixed on the drive shaft 3, a transition shaft 5 hinged on the other end of the lower contact connecting rod 11, and an upper contact connecting rod 4 hinged on the transition shaft 5. The upper contact connecting rod 4 is hinged to the trigger connecting shaft 2, and the trigger connecting shaft 2 is fixed on the trigger housing 1. The transition shaft 5 is a free shaft that is moveable in space, and the transition shaft 5 is parallel to the trigger connecting shaft 2

Referring to FIG. 1, the output shaft of the drive device 12 is the drive shaft 3. The drive shaft 3 is connected to the lower contact connecting rod 11, and the two are fixedly connected. and the rotation of the drive shaft 3 can drive the lower contact connecting rod 11 to rotate. The other end of the lower contact connecting rod 11 is hinged to the upper contact connecting rod 4 through the transition shaft 5. The upper contact connecting rod 4 is hinged to the trigger housing 1 through the trigger connecting shaft 2. Wherein the functions of the transition shaft 5 and the trigger connecting shaft 2 are respectively equivalent to hinge shafts, so that a link rod structure from the drive shaft 3 to the trigger housing 1 is formed.

The use of a link rod mechanism can transmit the rotation of the drive shaft 3 to the trigger housing 1 to make it rotate. When the length of each link rod is well adjusted, the problem of stuck caused by rotation can be avoided. Optionally, the specific connection manner of the link rod mechanism is not limited to the one provided in this embodiment, and may also be other link rod forms.

On the basis of the above embodiment, the end of the lower contact connecting rod 11 for connecting the transition shaft 5 has two parallel connecting parts, both of which are sleeved on the transition shaft 5. One end of the upper contact connecting rod 4 connected to the transition shaft 5 is clamped between the two connecting parts.

Referring to FIG. 1, the lower contact connecting rod 11 is a Y-shaped connecting rod, one end of which is bifurcated to form two connecting parts, which are arranged in parallel. Both connecting parts are provided with connecting holes, and both are sleeved on the transition shaft 5. Correspondingly, the upper contact connecting rod 4 can also be sleeved on the transition shaft 5, and the other end is connected to the trigger connecting shaft 2. Optionally, it can be sleeved outside or inside the trigger connecting shaft 2.

Optionally, the end of the upper contact connecting rod 4 connected to the transition shaft 5 may be located between the two connecting parts, or outside the two connecting parts.

On the basis of the above embodiment, the thickness of one end of the upper contact connecting rod 4 for connecting the trigger connecting shaft 2 is greater than the thickness of the other end.

Since one end of the upper contact connecting rod 4 is clamped between the two connecting parts, considering the size setting, this end is not suitable for obtaining higher stability by increasing the volume. However, the other end is hinged to the trigger connecting shaft 2, and the trigger housing 1 has a certain space inside, which is suitable for increasing the connecting structure. Therefore, the thickness of one end of the upper contact connecting rod 4 for connecting the trigger connecting shaft 2 is greater than the thickness of the other end, which helps to improve the stability of the link rod mechanism.

On the basis of any one of the above embodiments, the detection device includes a positioner 7 which is configured to detect the position of the trigger housing 1 or detect the angle of the trigger housing 1, and the positioner is arranged on the bracket 8.

There are various types of detection device. In order to adjust the trigger housing 1, it can directly detect the position, angle or force state of the trigger housing 1. Optionally, it can also be a type that detects the structure with the same motion state as the trigger housing 1.

In a reliable embodiment, the positioner 7 obtains the position of the trigger housing 1 by detecting the drive shaft 3, and the drive shaft 3 is connected to the positioner 7 through the positioner rotating shaft 10.

It should be noted that the output end of the drive shaft 3 is fixedly connected to the lower contact connecting rod 11. The lower contact connecting rod 11 transmits the rotation to the upper contact connecting rod 4, and the upper contact connecting rod 4 transmits the rotation to the trigger housing 1. Therefore, the drive shaft 3 can reflect the motion state of the trigger housing 1.

The detecting position of the positioner 7 is connected to the positioner rotating shaft 10. The positioner rotating shaft 10 is directly connected to the drive shaft 3 to obtain the state of the drive shaft 3.

In a specific embodiment, the rotation axis of the positioner rotating shaft 10 is collinear with the rotation axis of the drive shaft 3.

Specifically, the positioner rotating shaft 10 and the drive shaft 3 are directly connected and coaxially connected, and the two can rotate synchronously, which is convenient for the positioner 7 to obtain the state of the drive shaft.

In a specific embodiment, the trigger housing 1 is hinged to the bracket 8 through a hinge shaft, on which a torsion spring is sleeved. Two ends of the torsion spring abut the bracket 8 and the trigger housing 1 respectively.

An elastic member whose function is to reset the trigger housing 1 in a free state, can be used to connect the trigger housing 1 and the bracket 8, etc. In the present disclosure, in addition to the torsion spring, the elastic member may also be other type of elastic device, so as to realize the reset of the trigger housing 1. Of course, on the basis of any one of the above embodiments, the provision of the elastic member can not only ensure the reset of the trigger housing 1, but also implement a function of guiding the reset direction of the trigger housing 1.

Optionally, the trigger housing 1 is fixed to the hinge shaft, and the positioner 8 obtains the position of the trigger housing 1 by measuring the hinge shaft.

Considering that the trigger housing 1 and the bracket 8 are connected by a hinge shaft, and the trigger housing 1 and the hinge shaft are fixedly connected, the motion state and force of the trigger housing 1 can also be obtained through the hinge shaft. And since the hinge shaft simply rotates, the current state can be better determined.

In a specific embodiment, a groove through the main body is provided inside the trigger housing 1 for fixing the trigger connecting shaft 2. The trigger connecting shaft 2 is connected with the transition shaft 5 through the upper contact connecting rod 4, at meanwhile, the transition shaft 5 is connected to the lower contact connecting rod 11. The lower contact connecting rod 11 is connected with the drive device 12 through the drive shaft 3, at meanwhile, the drive shaft 3 is connected with the positioner 7 through the positioner rotating shaft 10. The positioner 7, the drive device 12 and the return spring 6 are fixed on the bracket 8. The other end of the return spring 6 is fixed inside the trigger housing 1 through a slot.

The control device can control the torque output by the drive device 12 according to the different game environments. The torque of the drive device 12 is transmitted to the transition shaft 5 through the lower contact connecting rod 11. The torque on the transition shaft 5 is transmitted to the trigger connecting shaft 2 through the upper contact connecting rod 4, so as to give a certain force feedback to the trigger casing 1. At this time, a movement output signal of the trigger casing 1 is fed back to the positioner 7 through the shaft. The state of the trigger housing 1 is transmitted to the upper system through an electrical signal, so as to form a closed-loop control system for the force feedback of the trigger housing 1, thereby achieves precise control of the feedback force and somatosensory effect conveyed by the trigger housing 1 to the user.

In addition to the main structure and connection relationship of the trigger driving apparatus provided in the above embodiments, the present disclosure also provides a hand-held terminal having said trigger driving apparatus. The hand-held terminal can be a gamepad, a remote control device, or other type of device with buttons or triggers. The structure of other parts of the hand-held terminal refers to the prior art, which will not be repeated herein.

The various embodiments in this specification are described in a progressive manner. Each embodiment focuses on the differences from other embodiments, and the same and similar parts among the various embodiments can be referred to each other.

The trigger driving apparatus and the hand-held terminal provided by the present disclosure have been described in detail above. The principles and implementations of the present disclosure are described herein by using specific examples. The descriptions of the above embodiments are only used to help to understand the method and the core idea of the present disclosure. It should be pointed out that for those skilled in the art, without departing from the principle of the present disclosure, several improvements and modifications can also be made, and these improvements and modifications also fall within the protection scope of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A trigger driving apparatus, comprising a bracket (8) and a movable trigger housing (1) arranged on the bracket (8), further comprising:
   a drive device (12), wherein a drive shaft (3) of the drive device (12) is connected to one end of a link rod mechanism, the other end of the link rod mechanism is connected to the trigger housing (1), and the drive shaft (3) is configured to drive the trigger housing (1) to move;
   a detection device is configured to detect the state of the trigger housing (1);
   a control device is configured to receive the state signal detected by the detection device, and control the output torque of the drive device (12) according to the state signal,
   wherein the link rod mechanism comprises a lower contact connecting rod (11) with one end fixed on the drive shaft (3), a transition shaft (5) hinged on the other end of the lower contact connecting rod (11), and an upper contact connecting rod (4) hinged on the transition shaft (5), wherein the upper contact connecting rod (4) is hinged to a trigger connecting shaft (2), and the trigger connecting shaft (2) is fixed on the trigger housing (1); the transition shaft (5) is a free shaft that is moveable in space, and the transition shaft (5) is parallel to the trigger connecting shaft (2).

2. The trigger driving apparatus according to claim 1, wherein the end of the lower contact connecting rod (11) for connecting the transition shaft (5) has two parallel connecting parts, both of the connecting parts are sleeved with the transition shaft (5), the end of the upper contact connecting rod (4) connected to the transition shaft (5) is clamped between the two connecting parts.

3. The trigger driving apparatus according to claim 2, wherein the thickness of the end of the upper contact connecting rod (4) for connecting the trigger connecting shaft (2) is greater than the thickness of the other end.

4. The trigger driving apparatus according to claim 1, wherein the detection device includes a positioner (7) which is configured to detect the position of the trigger housing (1) or detect the angle of the trigger housing (1), and the positioner (7) is arranged on the bracket (8).

5. The trigger driving apparatus according to claim 4, wherein the positioner (7) obtains the position of the trigger housing (1) by detecting the drive shaft (3), and the drive shaft (3) is connected to the positioner (7) through a positioner rotating shaft (10).

6. The trigger driving apparatus according to claim 5, wherein the rotation axis of the positioner rotating shaft (10) is collinear with the rotation axis of the drive shaft (3).

7. The trigger driving apparatus according to claim 4, wherein the trigger housing (1) is hinged to the bracket (8) through a hinge shaft, a torsion spring is sleeved on the hinge shaft, and two ends of the torsion spring abut the bracket (8) and the trigger housing (1) respectively.

8. The trigger driving apparatus according to claim 7, wherein the trigger housing (1) is fixed to the hinge shaft, and the positioner (8) obtains the position of the trigger housing (1) by measuring the hinge shaft.

9. A hand-held terminal, comprising the trigger driving apparatus in claim 1.

10. The trigger driving apparatus according to claim 2, wherein the detection device includes a positioner (7) which is configured to detect the position of the trigger housing (1) or detect the angle of the trigger housing (1), and the positioner (7) is arranged on the bracket (8).

11. The trigger driving apparatus according to claim 3, wherein the detection device includes a positioner (7) which is configured to detect the position of the trigger housing (1) or detect the angle of the trigger housing (1), and the positioner (7) is arranged on the bracket (8).

12. A hand-held terminal, comprising the trigger driving apparatus in claim 2.

13. A hand-held terminal, comprising the trigger driving apparatus in claim 3.

14. A hand-held terminal, comprising the trigger driving apparatus in claim 4.

15. A hand-held terminal, comprising the trigger driving apparatus in claim 5.

16. A hand-held terminal, comprising the trigger driving apparatus in claim 6.

17. A hand-held terminal, comprising the trigger driving apparatus in claim 7.

* * * * *